United States Patent
Ohsuge

(10) Patent No.: US 6,763,056 B1
(45) Date of Patent: Jul. 13, 2004

(54) PATH TIMING DETECTION CIRCUIT AND DETECTION METHOD THEREOF

(75) Inventor: Michihiro Ohsuge, Tokyo (JP)

(73) Assignee: NEC Corporation, Tokyo (JP)

(*) Notice: Subject to any disclaimer, the term of this patent is extended or adjusted under 35 U.S.C. 154(b) by 578 days.

(21) Appl. No.: 09/704,522

(22) Filed: Nov. 3, 2000

(30) Foreign Application Priority Data

Nov. 4, 1999 (JP) .......................................... 11-313166

(51) Int. Cl.⁷ .............................................. H04B 1/69
(52) U.S. Cl. ...................................... 375/140; 375/150
(58) Field of Search .................................. 375/130, 136, 375/142, 143, 147, 150; 370/320, 335, 342, 441

(56) References Cited

U.S. PATENT DOCUMENTS

| | | | |
|---|---|---|---|
| 5,631,921 A | | 5/1997 | Schilling |
| 5,724,384 A | * | 3/1998 | Kim et al. .................. 375/149 |
| 6,069,915 A | * | 5/2000 | Hulbert ...................... 375/150 |
| 6,075,809 A | * | 6/2000 | Naruse ....................... 375/147 |
| 6,134,262 A | * | 10/2000 | Kitade et al. ............... 375/142 |
| 6,151,353 A | * | 11/2000 | Harrison et al. ............ 375/136 |
| 6,208,291 B1 | * | 3/2001 | Krasner .................. 342/357.12 |
| 6,222,834 B1 | * | 4/2001 | Kondo ....................... 370/342 |
| 6,424,138 B1 | * | 7/2002 | Brownstein .............. 324/76.24 |
| 6,496,533 B2 | * | 12/2002 | Lennen ...................... 375/147 |

FOREIGN PATENT DOCUMENTS

| | | |
|---|---|---|
| JP | 09-321663 | 12/1997 |
| JP | 10-094041 | 4/1998 |
| JP | 10-190522 | 7/1998 |
| JP | 10/200444 | 7/1998 |
| JP | 10-200505 | 7/1998 |
| JP | 10-336072 | 12/1998 |

OTHER PUBLICATIONS

Rappaport S S et al: "Spread–Spectrum Signal Acquisition: Methods and Technology" IEEE Communications Magazine, IEEE Service Center. Piscataway, N.J. US, vol. 22, No. 6, Jun. 1, 1984 (Jun. 1, 1984), pp. 6–21.

Rick R R et al: Non–coherent parallel acquisition in CDMA spread spectrum systems, Communications, 1994. ICC '94, Supercomm/ICC '94, Conference Record 'Serving Humanity Through Communications. IEEE International Conference On New Orleans, LA, USA May 1–5, 1994, New York, NY, USA, IEEE. May 1, 1994 (May 1, 1994), pp. 1422–1426.

* cited by examiner

*Primary Examiner*—Emmauel Bayard
(74) *Attorney, Agent, or Firm*—Foley & Lardner LLP

(57) ABSTRACT

A path timing detecting circuit can save consumed current by omitting correlative arithmetic operations (cumulation) for unnecessarily long correlation lengths L when a propagation environment is relatively good, and a plurality of paths can be detected with high precision. The path timing detector circuit performing a correlative arithmetic operation of a spread modulation wave and a predetermined spread code with a given period of delay and detecting a reception timing of the spread modulation signal via each path on the basis of a result of the correlative arithmetic operation, includes a monitoring circuit for monitoring whether a cumulated value exceeds a threshold value during a process of the correlative arithmetic operation and a correlative arithmetic operation control circuit responsive to the cumulated value in excess of the threshold value for stopping the correlative arithmetic operation in a corresponding delay period.

20 Claims, 16 Drawing Sheets

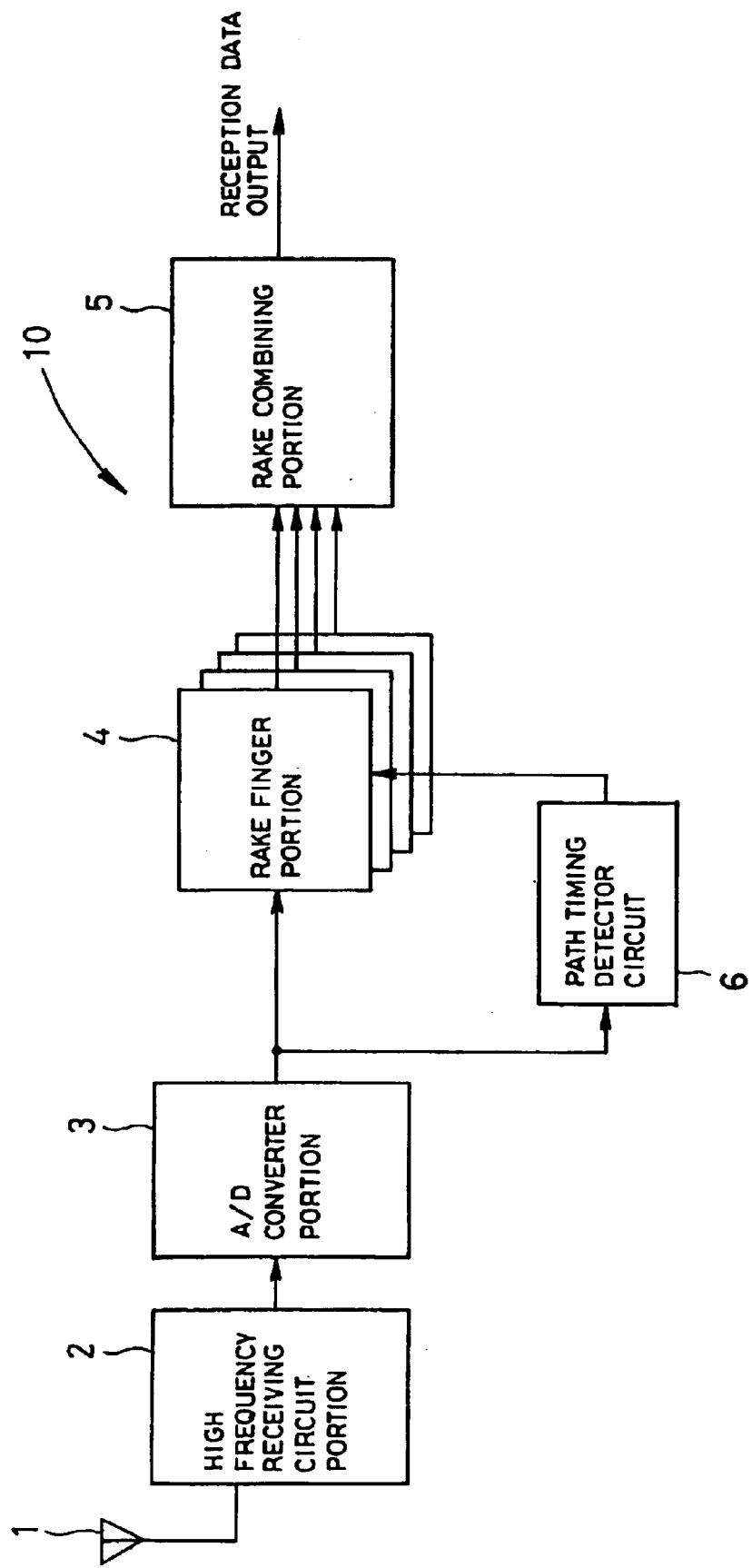

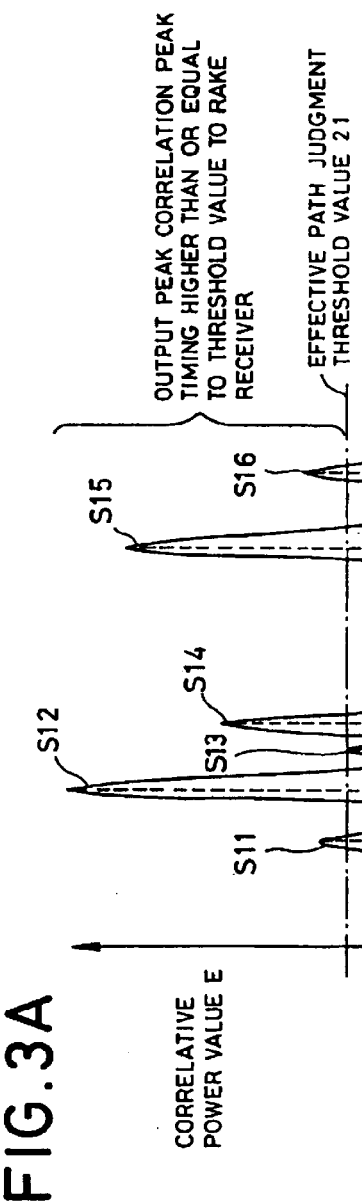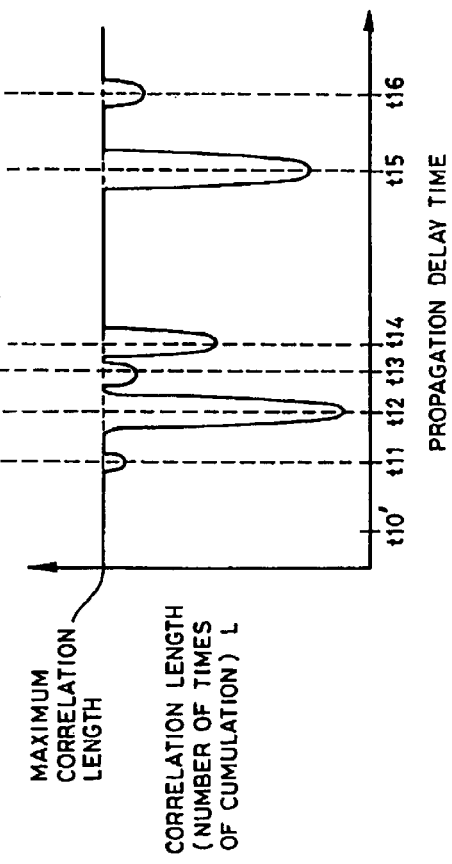
FIG.3A
FIG.3B

PATH TIMING DETECTION CIRCUIT AND DETECTION METHOD THEREOF

BACKGROUND OF THE INVENTION

1. Field of the Invention

The present invention relates generally to a path timing detection circuit and a detection method thereof. More particularly, the invention relates to a path timing detection circuit and a detection method thereof to be used for Code Division Multiple Access (CDMA) receiver device.

2. Description of the Related Art

The path timing detection circuit is for detecting an arrival timing of each signal from a transmission path (multiple paths). FIG. 15 is a diagrammatical explanatory illustration for explaining multiple paths. As shown in FIG. 15, signals transmitted to a receiver device 102 from a transmission device 101 are a signal S1 to be directly received by the receiver 102 from the transmitting device 101, a signal S2 transmitted from the transmitting device 101 and received by the receiver device 102 as reflected from a barrier 103, and a signal S3 transmitted from the transmitting device 101 and received by the receiver device 102 as reflected from a barrier 104, for example. The signals S2 and S3 from the transmitting device 101 are reflected by the barriers 103 and 104 and then reach the receiving device 102. Therefore, a timing to reach the receiving device 102 is delayed from that of the signal S1.

FIG. 16 is an explanatory illustration of a reception timing for explaining the multiple paths. In FIG. 16, an ordinate axis represents a signal level and an abscissa axis represents a time. As shown in FIG. 16, the signal S2 having the shortest transmission path next to the signal S1 is received at second, and the signal S3 having the longest transmission path is received at the last.

The path timing detection circuit according to the present invention is particularly used for determining a reception timing of a finger of RAKE receiver employed in the communication device of a CDMA system.

Such path timing detection circuit is generally realized by measuring a delay profile of the transmission path by performing correlated arithmetic operations of a reception signal and spread code using a sliding correlator or matched filter (delay line matched filter) and detecting a correlated peak position of the delayed profile. The "delayed profile" means the characteristics shown in FIG. 16. Namely, the "delay profile" means delay periods t1 to t3 of the signal and an average distribution of intensities V1 to V3.

Here, brief discussion will be given for "correlated arithmetic operation of the reception signal and the spread code". FIG. 17 is a diagrammatic illustration for explaining the correlated arithmetic operation of the reception signal and the spread code. As one example, the reception data is expressed by R(n) of (n+1) in number (wherein n is positive integer) and the spread code is expressed by P(n) of (n+1) in number. Here, the reception data R(n) is a signal modulated by a predetermined spread code upon transmission. As the spread code P(n) to be used in the correlated arithmetic operation, the same code as the spread code upon transmission is used. As shown in FIG. 17, one symbol is formed with (N+1) chips.

The "correlated arithmetic operation of the reception signal and the spread code" is similar in meaning to despreading of the reception signal. Namely, in the correlated arithmetic operation, multiplication of the reception data R(0) and the spread code P(0), multiplication of the reception data R(1) and the spread code P(1) and similarly, multiplication of the reception data R(n) and the spread code P(n) are performed. Next, all of these products of multiplication are summed. Accordingly, an added value D is expressed by sum of the products of multiplication (R(0)×P(0)+R(1)×P(1)+ ... R(n)×P(n)). The added value D represents a correlated power E of the received signal. When the correlated power E exceeds a predetermined value, the received signal is judged as the objective signal. On the other hand, the number of times of multiplication of the reception data R(n) and the spread code P(n) becomes the number of times of cumulation L (or correlation length) (namely, L=n+1).

Here, for application of a portable telephone or the like, both down-sizing lower current consumption, and higher performance associated with broadening of the band of the CDMA system are required. In order to satisfy this demand, as disclosed in Japanese Unexamined Patent Publication No. Heisei 10-190522 (hereinafter referred to as reference 1), for example, an average delay profile is generated using the matched filter and an average signal power measuring portion, a threshold value depending upon a maximum value signal power of the average profile is set, and the multiple paths exceeding the threshold value is selected as a RAKE combination object.

In the conventional correlator as disclosed in the foregoing reference i, a result of correlation resulting from correlating arithmetic operation over a predetermined correlation length (number of times of cumulation) L is output. When the level of the correlation value E as output of the correlator is high, judgment is made that the reception wave (path) is detected. The correlation length can be relatively short when the level of noise and interfering wave in the propagation environment is low.

In Japanese Unexamined Patent Publication No. Heisei 9-321663 (hereinafter referred to as reference 2), an example of a synchronization tracking device setting a correlation length L of the correlator depending upon a power of the path is disclosed. In the method disclosed in the reference 2, the correlation length L can be set shorter in relative good propagation environment and can be set longer in a relatively worse propagation environment. Therefore, path tracking can be performed at constantly stable conditions.

On the other hand, another example of the path timing detection circuits have been disclosed in Japanese Unexamined Patent Publication No. Heisei 10-94041, Japanese Unexamined Patent Publication No. Heisei 10-336072, Japanese Unexamined Patent Publication No. Heisei 10-200444 and Japanese Unexamined Patent Publication No. Heisei 10-200505.

However, with the invention disclosed in the foregoing reference 1, when the propagation environment is bad, the path buried in the noise cannot be detected unless the correlation length L is set sufficiently long. Accordingly, in order to maintain reception performance of the device, it is required to form the correlator having a long correlation length L adapting to the case of a bad propagation environment. However, wasteful arithmetic operation is inherently performed when the propagation environment is good.

On the other hand, the invention disclosed in the foregoing reference 2 is used as synchronization capturing means for maintaining synchronization for a found path instead of detecting a plurality of paths from a wide range. Therefore, means for detecting a plurality of paths have not been proposed. None of other references provides such a teaching.

SUMMARY OF THE INVENTION

An object of the present invention to provide a multiple path timing detecting circuit and a detection method thereof, which can save the amount of current consumed by omitting correlative arithmetic operation (cumulation) of an unnecessarily long correlation length L when a propagation environment is relatively good, and a plurality of paths can be detected with high precision.

According to the first aspect of the invention, a path timing detector circuit performing a correlative arithmetic operation of a spread modulation wave and a predetermined spread code with a given period of delay and detecting a reception timing of the spread modulation signal via each path on the basis of a result of the correlative arithmetic operation, comprises:

a monitoring device for monitoring whether a cumulated value exceeds a threshold value during the correlative arithmetic operation process; and a correlative arithmetic operation controller responsive to the cumulated value in excess of the threshold value for stopping the correlative arithmetic operation in a corresponding delay period.

The correlative arithmetic operation may be performed for a plurality of times with the given period of delay. The path timing detector circuit may further comprise a holding amount for holding a number of times of cumulation at the time of stopping of the correlative arithmetic operation, and a path candidates classifying device for classifying detected candidates according to the held number of times of cumulation.

The path timing detector circuit may comprise a plurality of correlative arithmetic operation devices for performing a plurality of correlative arithmetic operations simultaneously corresponding to a plurality of delay periods. Also, the path timing detector circuit may further comprise a second correlative arithmetic operation controller for stopping arithmetic operations in all of the correlative arithmetic operation when number of cumulated values exceeding the threshold value, exceeds a predetermined number. A plurality of correlative arithmetic operation devices may be grouped to form sets per at least two, and the path timing detector circuit further includes OR devices for obtaining OR of the outputs of one set of monitoring means with respect to one set of correlative arithmetic operation devices, the correlative arithmetic operation control means stops correlative arithmetic operation by one set of correlative arithmetic operation devices on the basis of the output from the OR amount. The cumulation circuit may include an adder which overflows when the threshold value is exceeded, and the monitoring devices makes judgment that the threshold value is exceeded upon occurrence of overflow.

The path timing detector circuit may further include an average value deriving circuit for deriving an average value of number of times of cumulation of path candidate output from the path candidate classifying circuit. Furthermore, the path timing detector circuit may further comprise threshold value estimating circuit for estimating the threshold value from the output from a plurality of correlative arithmetic operation circuits.

The path timing detector circuit may further comprise a reception field intensity estimating circuit for estimating a field intensity of a reception wave on the basis of number of times of cumulation at a time where the cumulated value in the process of the correlative arithmetic operation exceeds the threshold value and an AGC coefficient of a high request reception circuit upon reception of the reception wave causing the cumulated value.

According to the second aspect of the present invention, a path timing detection method performing a correlative arithmetic operation of a spread modulation wave and a predetermined spread code with a given period of delay and detecting a reception timing of the spread modulation signal via each path on the basis of a result of the correlative arithmetic operation, comprises:

a first step of monitoring whether a cumulated value exceeds a threshold value during a process of the correlative arithmetic operation; and a second step initiated in responsive to the cumulated value in excess of the threshold value, of stopping the correlative arithmetic operation in a corresponding delay period.

The correlative arithmetic operation may be performed for a plurality of times with the given period of delay. The path timing detector method may further comprise a third step of classifying detected candidates according to held number of times of cumulation upon stopping of the correlative arithmetic operation at the second step.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 2 is a constructional illustration of a major part of a CDMA receiver device including a path timing detection circuit according to the present invention;

FIGS. 3A and 3B are characteristic charts of one example of a delay profile of a propagation path;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structure are not shown in detail in order to avoid unnecessary obscurity of the present invention.

Figure 1:
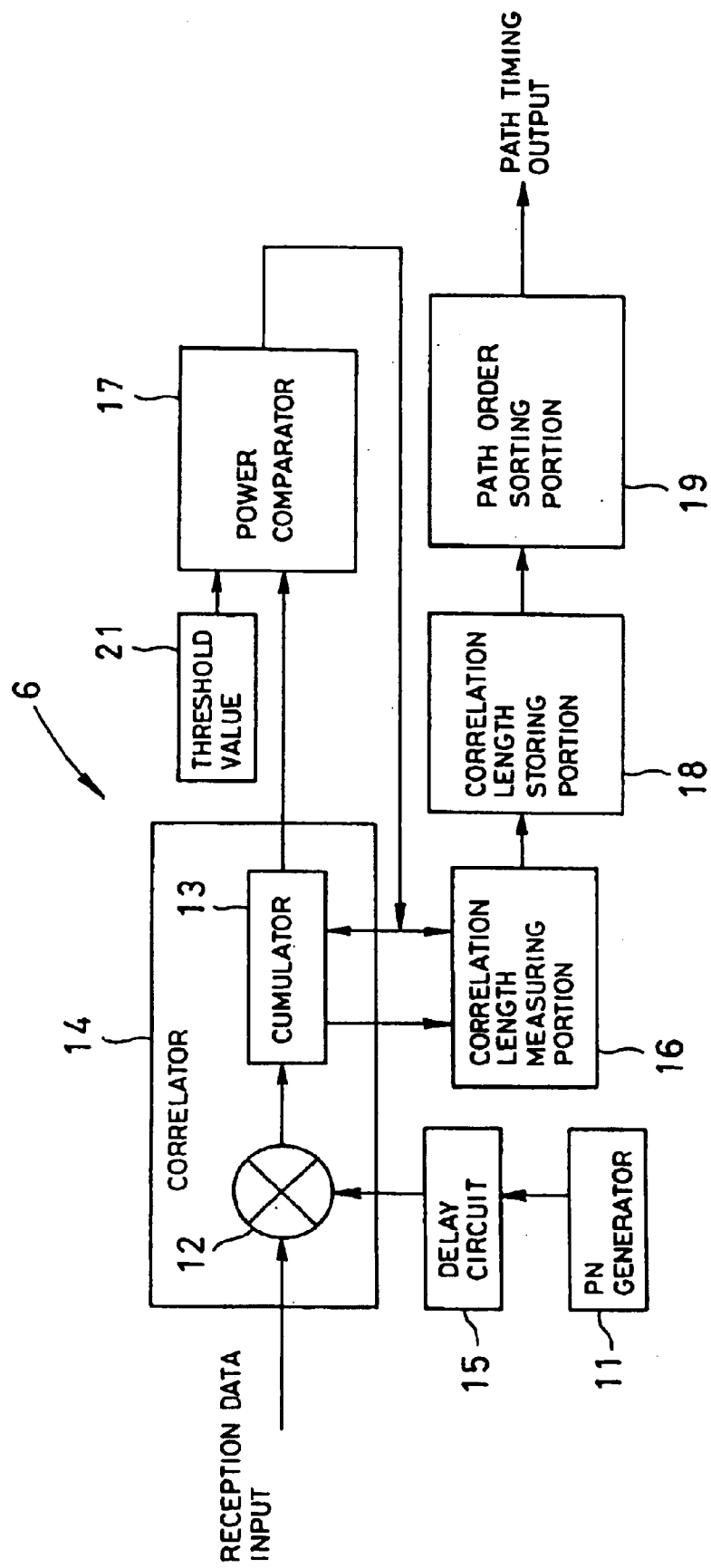
FIG. 1 is a constructional illustration showing the best mode of a path timing detection circuit according to the present invention.

FIG. 1 is a constructional illustration showing the best mode of a path timing detection circuit according to the present invention, and FIG. 2 is a constructional illustration of a major part of a CDMA receiver device including a path timing detection circuit according to the present invention.

At first, discussion will be given for a construction of the major part of a CDMA receiving device with reference to FIG. 2. The CDMA receiving device is constructed with an antenna portion 1, a high frequency receiver circuit portion 2, an A/D converter portion 3, a RAKE finger portion 4, a RAKE combining portion 5 and a path timing detecting portion 6.

A data (spread modulated wave) transmitted in radio wave is input to the high frequency receiver circuit portion 2 via the antenna portion 1 to be subject to frequency conversion (down-conversion). Next, frequency converted data is input to the A/D converter 3 and is converted from an analog signal into a digital signal. Then, the data converted into digital signal is supplied to the path timing detecting portion 6. In the path timing detecting portion 6, a delay profile of the propagation path is measured for detecting a timing of the multiple paths. Then, a detection value is used a reception timing input of the RAKE finger portion 45. The data received at respective timing is combined in the RAKE combining portion 5.

Figure 16:
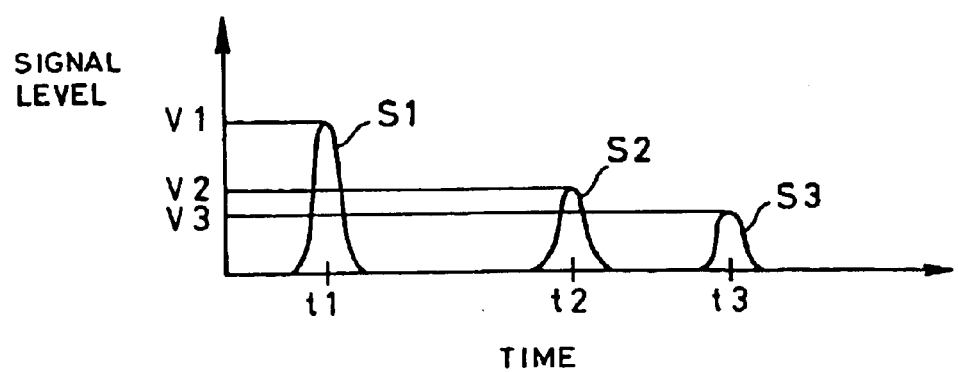
FIG. 16 is an explanatory illustration of a reception timing for explaining the multiple path.
Figure 17:
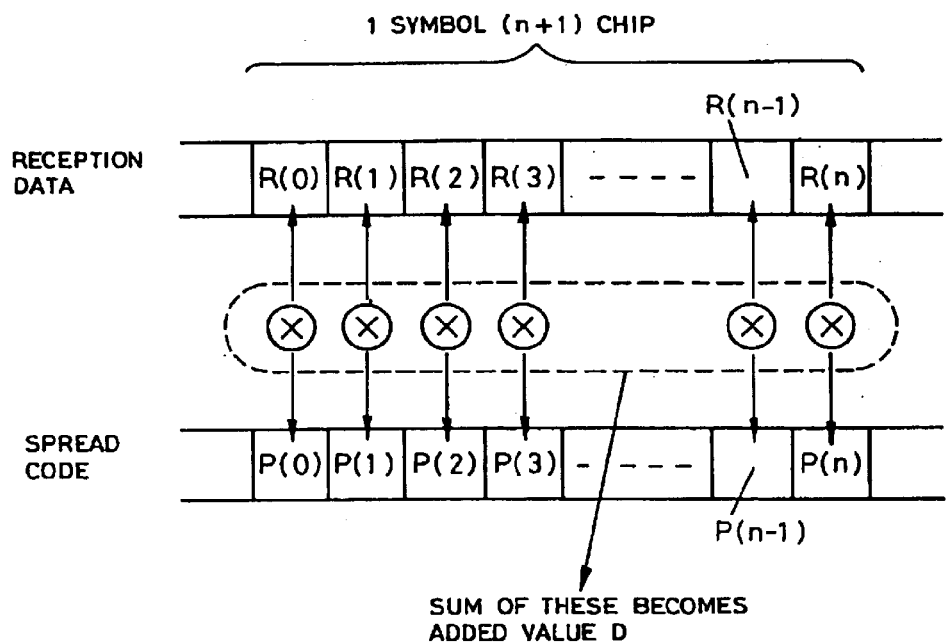
FIG. 17 is a diagrammatic illustration for explaining a correlative arithmetic operation of a reception signal and a spread code.

FIGS. 3A and 3B are characteristic charts of one example of the delay profile of the propagation path. FIGS. 3A and 3B show another example of FIG. 16. In FIG. 3A, an ordinate axis represents a correlated power value (correlated value) E and an abscissa axis represents a propagation delay period t (namely, elapsed time). FIG. 3A shows that data S11 is detected by the bus timing detecting portion 6 at a timing $t_{11}$, data S12 is detected at a timing $t_{12}$, data S13 is detected at a timing $t_{13}$, data S14 is detected at a timing $t_{14}$, data S15 is detected at a timing $t_{15}$ and data S16 is detected at a timing $t_{16}$, respectively.

Figure 4:
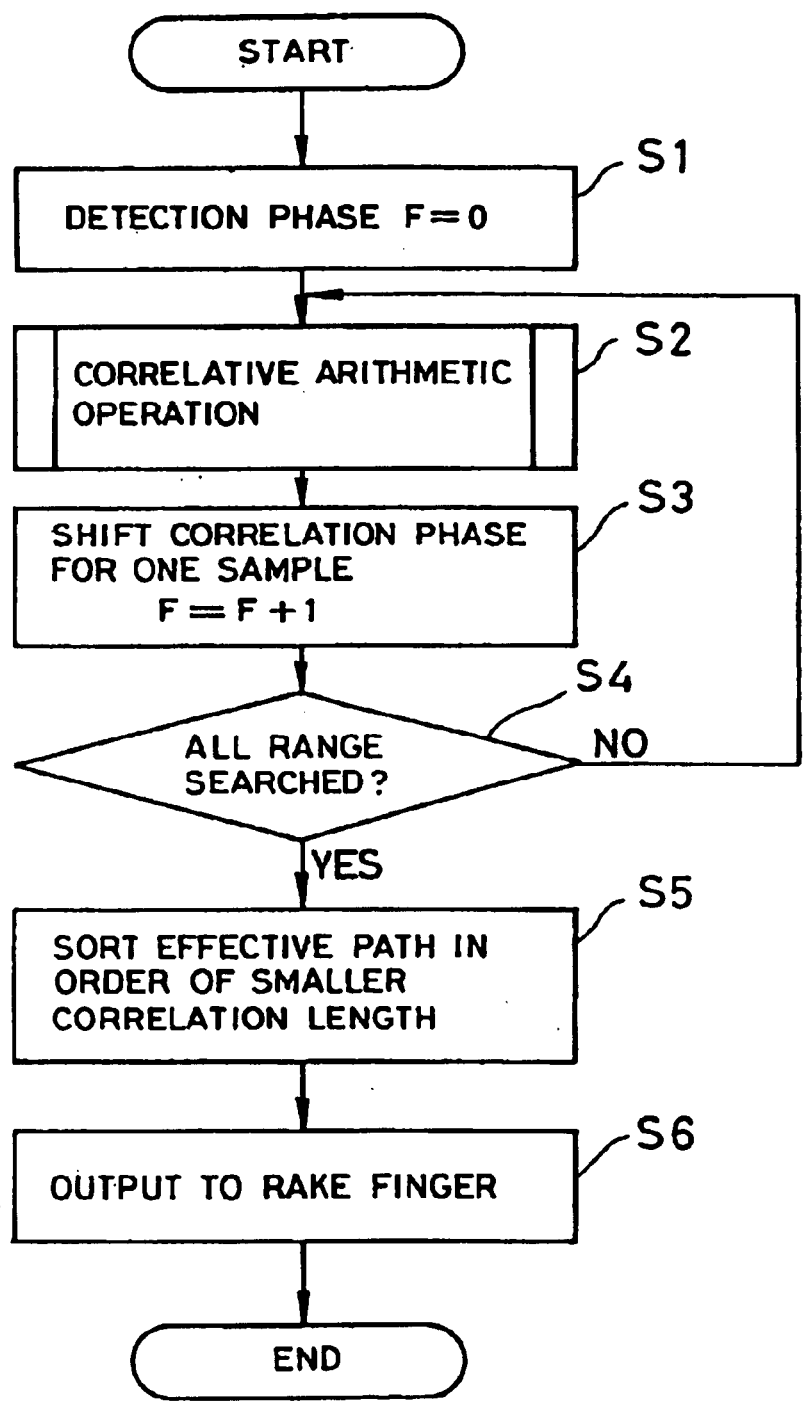
FIG. 4 is a flowchart showing an operation of the path timing detection circuit.

Next, discussion will be given for the operation of the path timing detection circuit in the CDMA receiving device. FIG. 4 is a flowchart showing the operation of the path timing detection circuit. Referring to FIG. 4, at first, from a preliminarily set delay profile measurement start timing (detection phase F=0), namely a propagation delay timing $t_{10}$ of FIG. 3A (S1), correlative arithmetic operation is performed (S2) to make judgment whether the result of correlative arithmetic operation exceeds a threshold value or not, namely whether an effective path to receive is present or not. Next, with shifting the timing to perform correlative arithmetic operation per one sample (F=F+1; e.g. from a timing $t_{10}$ to a timing $t_{10}'$ advanced for a given period), similar correlative arithmetic operation is performed (S3). Then, these processes S2 and S3 are performed until search of overall range is completed (in case of NO at S4). This "overall range" means the propagation delay timing $t_{10}$ to $t_{17}$ of FIG. 3A. After completion of search over the overall arrange (in the case YES at S4), the path timing judged as being effective is sorted in ascending order of the correlation lengths L (S5) and is output as reception timing of the RAKE finger in order (S6). Here, assuming that four RAKE finger portions 4 are present, as one example, four path timings judged as being effective are extracted in ascending order of the correlation length to output to respective RAKE finger portions 4.

Next, discussion will be given for the construction of the path timing detection circuit. Referring to FIG. 1, the path timing detection circuit 6 is provided with a PN generator 11 generating the spread code, a correlator 14 constructed with a multiplier 12 performing correlative arithmetic operation of a generated PN series and the reception signal and a cumulator 13, a delay circuit 15 for calculating correlation values at respective reception timing, a correlation length measuring portion 16 for measuring a correlation length L by counting number of times of cumulation in the cumulator 13, a power comparator 17 comparing the result of correlative arithmetic operation and a threshold value 21, a correlation length storing portion 18 for storing the correlation length L when the correlation value exceeds the threshold value 21, and a path order sorting portion 19 sorting the cumulation number (correlation length) L in ascending order from the minimum value until the threshold value 21 is reached at each reception timing. The path timing detection circuit 6 performs correlative arithmetic operation of the spread code P and the reception signal R at the reception timing depending upon the delay circuit 15 per delay amount. The correlative arithmetic operation may be performed either when the reception data is real data processed by Bi-Phase Shift Keying (BPSK) or when the reception data is a complex data modulated by Quadrature Phase Shift Keying (QPSK).

In the conventional correlator, the result of correlative arithmetic operation over a given correlation length (number of cumulation) is output to make judgment that the reception wave (path) is detected when the correlation value level is high. The correlation length in the correlative arithmetic operation can be relatively short when the level of noise and interference wave in the propagation environment is low, and the path buried in the noise cannot be detected unless the correlation length is set sufficiently long when the propagation environment is bad.

Therefore, according to the present invention, without performing correlative arithmetic operation over the given correlation length, judgment is made as to an effective path at a timing where the threshold value set to the correlation value E, is reached by the power comparator 17 to stop the correlative arithmetic operation. At this time, the correlation length L is stored in the correlation length storing portion 18. The correlative arithmetic operation is performed at several points by shifting the value of the delay circuit 15 for searching the path positions that exceed the threshold value 21. When a plurality of (effective) paths exceeding the threshold value 21 are detected, the preferenial order of the reception timing, such as, first path, second path and so forth from the one having the shortest correlation length among those stored in the correlation length storing portion 18 are decided.

This is based on the consideration that when a predetermined correlation value (correlation power) E is obtained, it is highly probable to have higher reception power at shorter correlation length L. In FIGS. 3A and 3B, there are shown relationship between the correlated power value E and the correlation length L. For example, at the delay time $t_{10}'$, it is illustrated that the correlation value E does not reach the threshold value 21 even at the maximum correlation length L, namely even when cumulation is performed at the maximum number of times. At the delay times $t_{11}$, $t_{12}$, $t_{13}$, $t_{14}$, $t_{15}$ and $t_{16}$, it is shown that the correlated power value E reaches the threshold value 21 before the cumulation reaches the maximum number of times of correlation. Namely, the fact that the correlation power value E reaches the threshold value 21 at smaller number of times of cumulation in comparison with others, means that the power value of such reception signal is higher than other reception signal.

Accordingly, when the propagation environment is good, sufficient correlation value can be detected at relatively short correlation lengths to terminate correlative arithmetic operation at mid-way. On the other hand, by reducing the number of correlated values to be summed, capacity of the buffer portion for storing the result of arithmetic operation and bit number of the adder can be reduced. As set forth above, with the shown embodiment, circuit scale and current consumption can be reduced. Also, even when a plurality of paths having the correlation power value E exceeding the threshold value are detected, since a preferential order can be set, stable reception performance can be obtained. It should be noted that while the delay circuit 15 is arranged on the output side of the PN generator 11, the similar effect can be obtained even when the delay circuit 15 is arranged on the input side of the multiplier 12. On the other hand, the PN generator 11 of FIG. 1 and the RAKE fiber portion 4 of FIG. 2 are well known to those skilled in the art and are not directly relate to the present invention. Therefore, discussion for these components will be omitted in order to keep the disclosure simple enough to facilitate clear understanding of the present invention.

Figure 5:
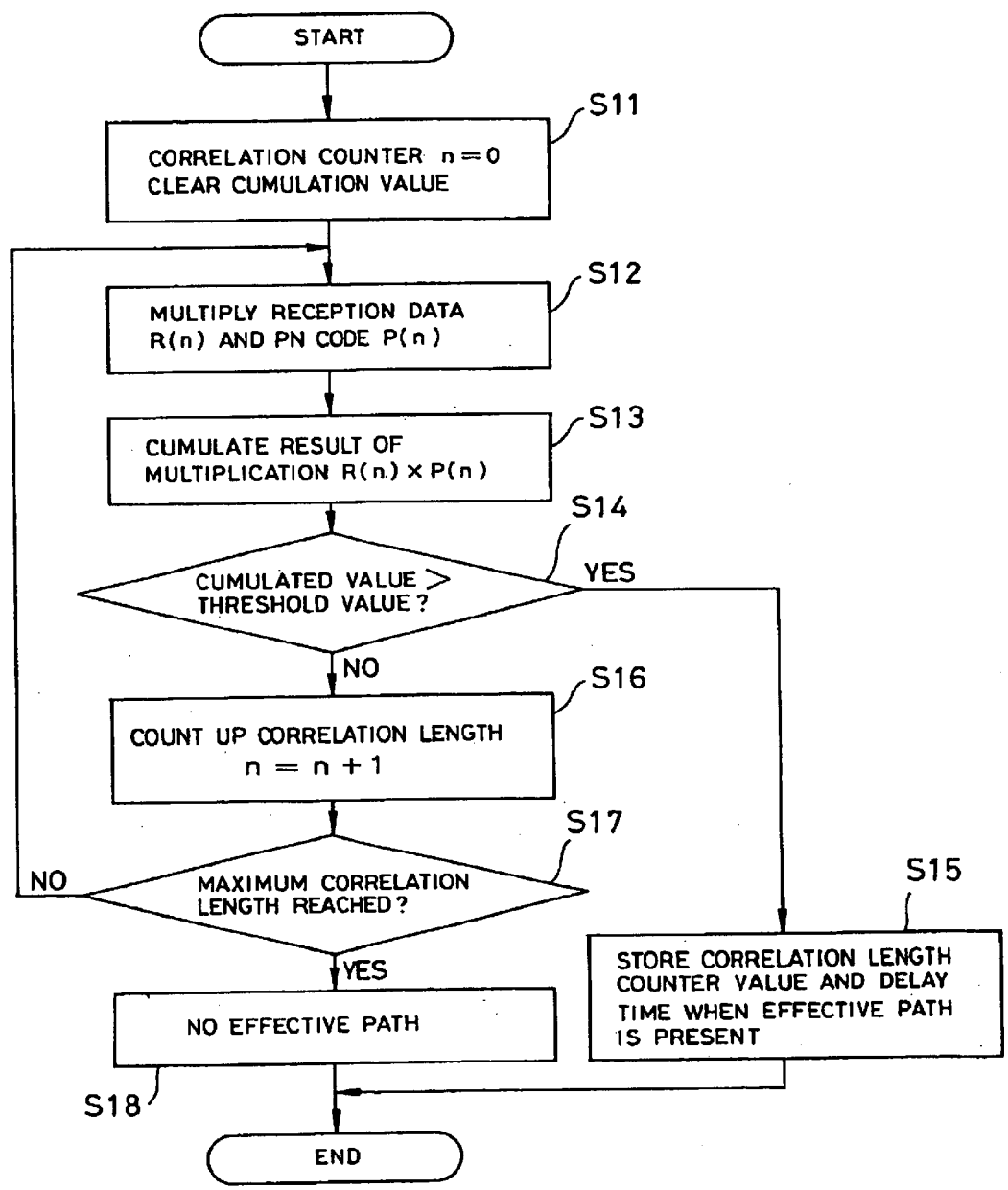
FIG. 5 is a flowchart showing an operation of a correlator 14.

Next, discussion will be given for operation of the correlator 14. FIG. 5 is a flowchart showing the operation of the correlator 14. At first, a correlation length counter n indicating the length of the correlation length L is cleared to zero to clear the value of the cumulator 13 (S11). Next, the spread code (PN code) P(n) and the reception data R(n) are multiplied (S12). This multiplication is performed for a plurality of times from n=0 to n=1, n=2, . . . Then, the result of multiplication is cumulated (S13). When the result of cumulation D (namely, correlation value E) exceeds the preliminarily set threshold value 21 (YES at S14), correlative arithmetic operation is terminated to store the count value L of the correlation length at the timing of exceeding the threshold value.

On the other hand, when the threshold value is not exceeded at S14 (when NO at S14), cumulation (S12 and S13) is performed by incrementing the correlation length counter n by one (S16). If the correlation length does not reach the maximum correlation length (when NO at S17), the process returns to step S12 to repeat the processes at steps S12 and S13. If the cumulation D does not exceed the threshold value (when NO at S14) and number of cumulation (correlation length) reaches the predetermined correlation length (maximum correlation length) (when YES at S17), judgment is made than no effective path is present (S18) to terminate operation. These processes of steps S11 to S18 are performed with respect to each delay period.

In the path timing detection circuit 6 in the shown embodiment, since the correlative arithmetic operation is terminated when the set threshold value 21 is exceeded, the path can be detected at a short correlation length when the propagation environment is good so as not to perform an unnecessary extra arithmetic operation. Therefore, current consumption can be reduced. Also, the bit number of the result of correlation can be reduced to be smaller than that of the result of normal arithmetic operation. Therefore, bit number of the cumulator 13 and a buffer storing the cumulated value D can be reduced to reduce circuit scale. Furthermore, in the shown embodiment, by providing a function to perform providing preferential order among the effective paths on the basis of the correlation length L when the threshold value is exceeded, even when the effective paths is greater in number than the number of fingers, the paths can be assigned to the finger from those having higher preferential order to prevent degradation of performance.

Figure 6:
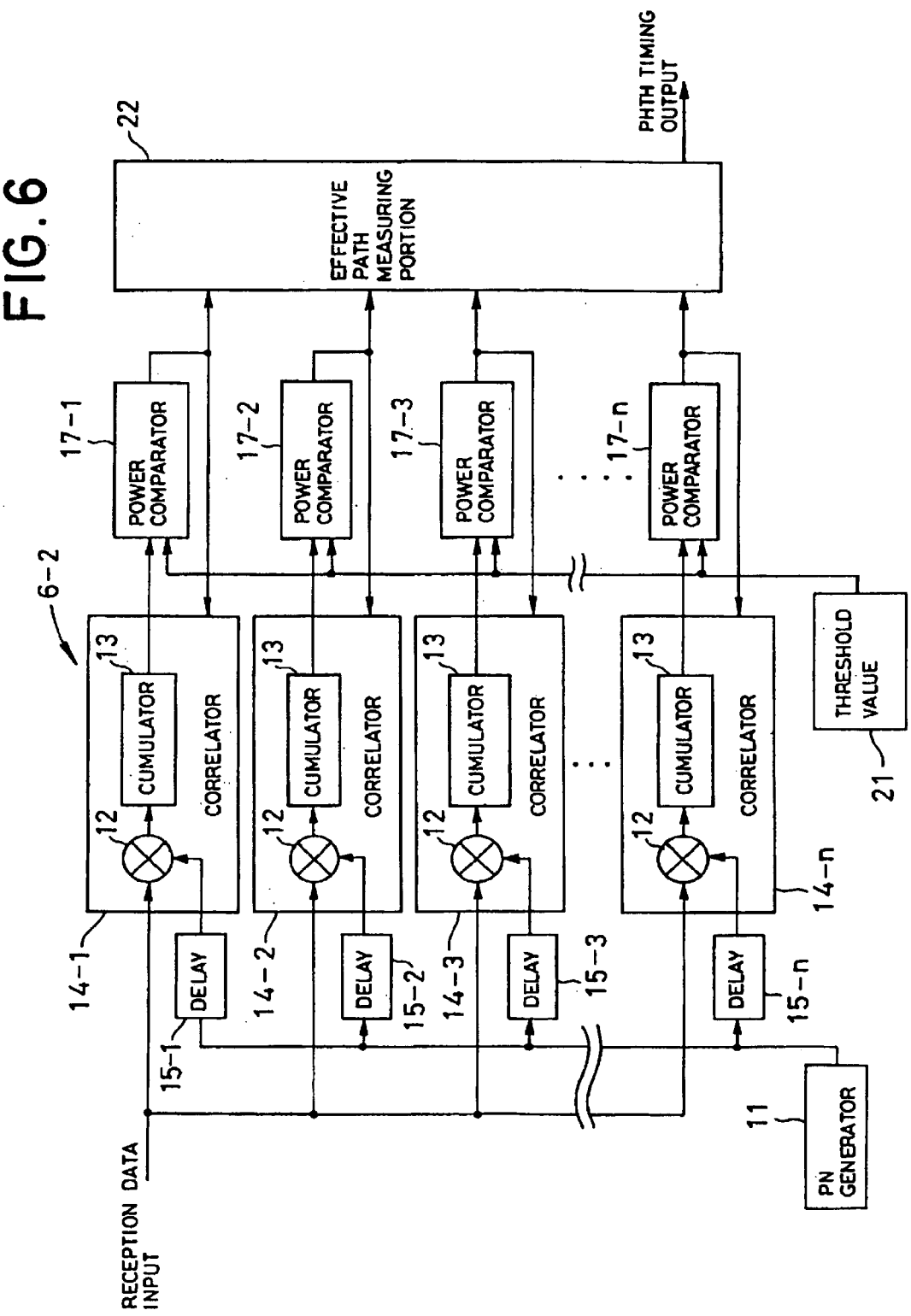
FIG. 6 is a constructional illustration of the first embodiment of the path timing detection circuit 6 according to the present invention.

Next, discussion will be given for the embodiment of the path timing detection circuit 6. At first, discussion will be given for the first embodiment. In the embodiment of the present invention set forth above, the path timing detection circuit 6 has one correlator 14, this first embodiment has a plurality of correlators. FIG. 6 is a constructional illustration of the first embodiment of the path timing detection circuit 6. In FIG. 6, components similar to the former embodiment (FIG. 1) will be identified by the same reference numerals and discussion therefor will be omitted in order to avoid redundant discussion and whereby to keep the disclosure simple enough to facilitate clear understanding of the present invention.

Referring to FIG. 6, a path timing detecting circuit 6-2 is constructed with one PN generator 11, n in number of delay circuits 15 (15-1 to 15-n), n in number of correlator 14 (14-1 to 14-n), n in number of power comparators 17 (17-1 to 17-n), one threshold value 21 and one effective path number counting portion 22.

For respective of n number of delay circuits 15, mutually different delay times are set with a predetermined constant difference. For example, using the example illustrated in FIGS. 3A and 3B, it is assumed that the delay time $t_{11}$ is set in the delay circuit 15-1, the delay time $t_{12}$ is set in the delay circuit 15-2, the delay time $t_{13}$ is set in the delay circuit 15-3, the delay time $t_{14}$ is set in the delay circuit 15-4 (not shown), a the delay time $t_{15}$ is set in the delay circuit 15-5 (not shown), and the delay time $t_{16}$ is set in the delay circuit 15-6 (not shown), or otherwise, times slightly before respective delay times are set for respective delay circuits. In this condition, when path timing detection is initiated, six correlators 14-1 to 14-6 start cumulation at substantially the same timing. Therefore, as shown in FIG. 3B, the signal S12 having the shortest correlation length L reaches the threshold value 21 at first. Accordingly, the effective path number counting portion 22 stores the delay time $t_{12}$ at which the signal S12 is obtained, and the correlation length L thereof.

Now, assuming that four RAKE finger portion 4 in FIG. 2 are provide, the effective path number counting portion 22 stores the delay time $t_{12}$, $t_{15}$, $t_{14}$ and $t_{16}$ between the signal S15 having the second shortest correlation length L next to the signal S12, the signal S14 having the correlation length of the length L shorter next to the signal S15 and the signal S16 having the correlation length of the length L shorter next to the signal S14, and their correlation lengths L. Then, the combination of the delay time t and the corresponding correlation length L are fed to each RAKE finger. Then, at a time where the four effective path number (signals S12, S15, S16 and S14) are counted by the effective path number counting portion 22, the path timing detection circuit 6-2 terminates arithmetic operation in all of the correlators 14-1 to 14-n.

By this, at a timing where necessary number of path timings are found, outputting to the RAKE finger portion 4 becomes possible and the path order sorting portion 19 in the former embodiment become unnecessary. Therefore, simplification of the circuit and lowering of current consumption can be achieved.

Figure 7:
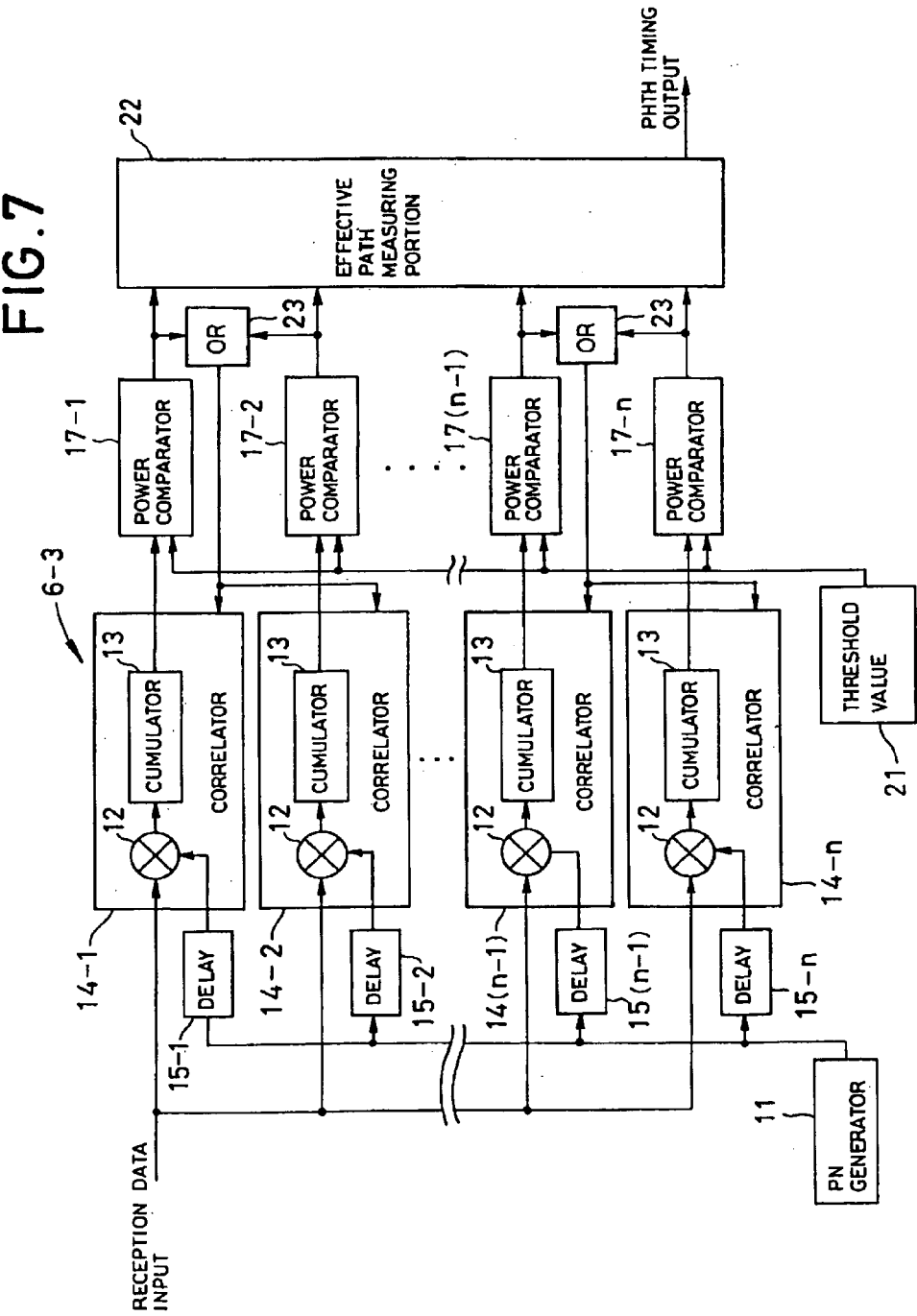
FIG. 7 is a constructional illustration of the second embodiment of the path timing detection circuit 6 according to the present invention.

Next, discussion will be given for the second embodiment. FIG. 7 is a construction a illustration of the second embodiment of the path timing detector circuit according to the present invention. In FIG. 7, like components to those in the first embodiment (FIG. 6) will be identified by like reference numerals and de tailed discussion therefor will be omitted in order to avoid redundant discussion and whereby to keep the disclosure simple enough to facilitate clear understanding of the present invention. The second embodiment is differentiated from the first embodiment in that a path timing detection circuit 6-3 in the second embodiment has correlators 14 grouped per two. For example, the correlators 14-1 and 14-2 form one group to input outputs of the power comparators 17-1 and 17-2 to an OR circuit 23. With the output of the OR circuit 23, arithmetic operations of the correlators 14-1 and 14-2 are controlled. Similarly, one group is formed with the correlators 14-(n–1) and 14-n to input outputs of the power comparators 17-(n–1) and 17-n to the OR circuit 23 to control arithmetic operation of the correlators 14-(n–1) and 14-n with the output of the OR circuit 23.

Figure 8:
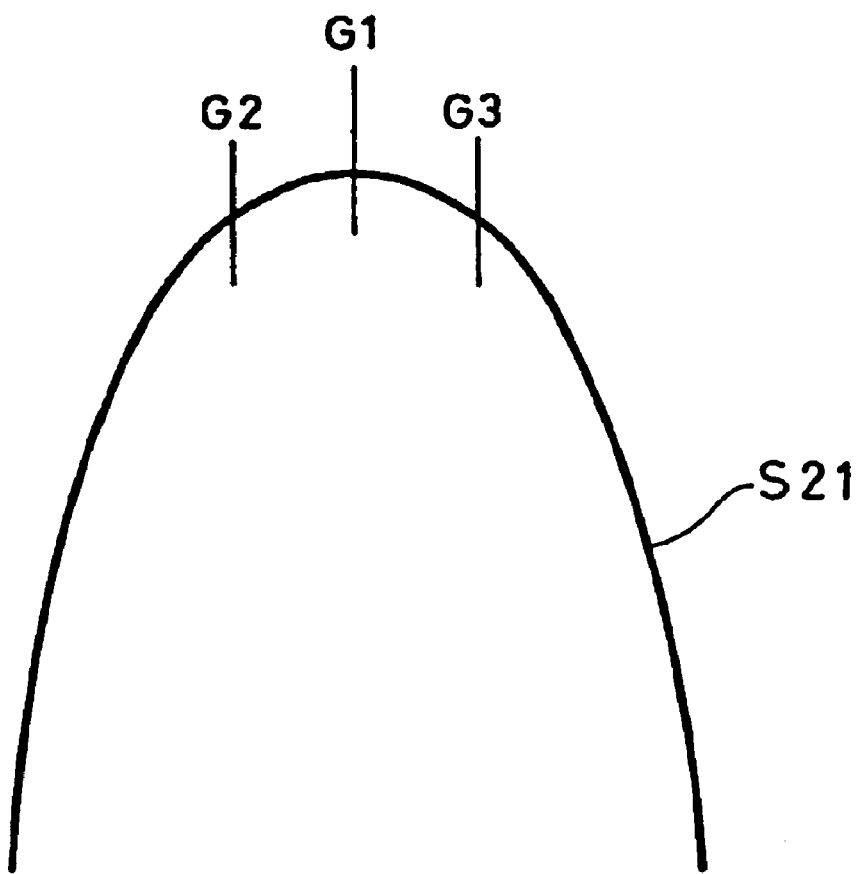
FIG. 8 is a diagram of one example of sampling.

With the construction set forth above, when at least one of the correlation value E in one group exceeds the threshold value, stop signal is generated by the OR circuit 23 for all of the correlators 14 in the group. Thus, only one effective path can be found in one group. However, as shown in the diagram of one example of sampling in FIG. 8, for example, when over sampling is performed in one chip and when the one group is formed with one chip, even if the signal S21 is received at three timing G1, G2 and G3 in one chip, only the same path can be received. The reason is that, in the shown sampling timing, it is merely performs sampling for three times new the peak of the same signal S21. Therefore, in this case, it is sufficient to detect one timing (desirably the closest timing G1 to the peak point) in one group. In such case, by utilizing the shown construction, current consumption can be further reduced.

It should be noted that in the shown embodiment, two power comparators 17 forms a set. However, one set may be formed with three or more power comparators to achieve similar effect.

Figure 9:
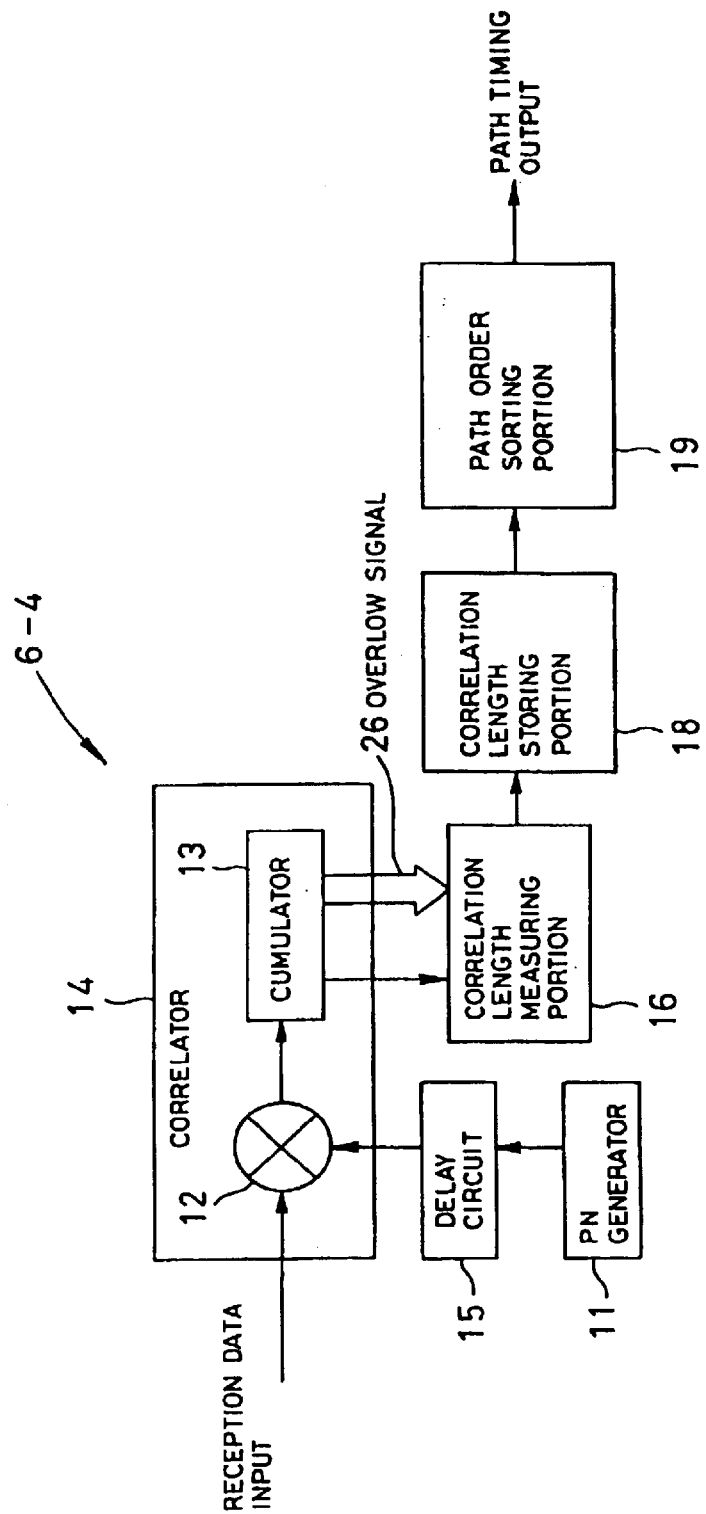
FIG. 9 is a constructional illustration of the third embodiment of the path timing detection circuit 6 according to the present invention.
Figure 10:
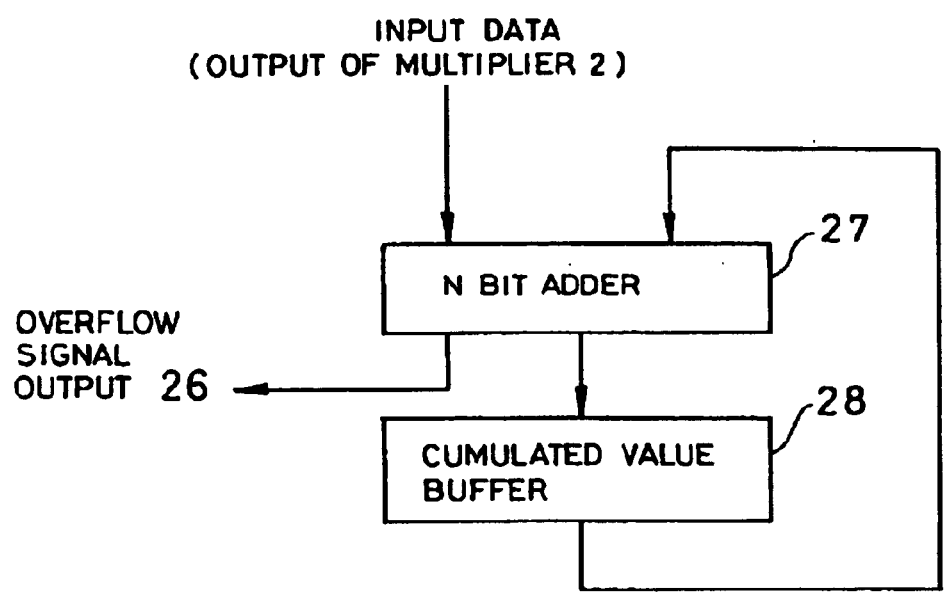
FIG. 10 is a constructional illustration of a cumulator.

Next, discussion will be given for the third embodiment. FIG. 9 is a constructional illustration of the third embodiment of the path timing detector circuit according to the present invention and FIG. 10 is a constructional illustration of a cumulator. In FIG. 7, like components to those in the former embodiment (FIG. 1) will be identified by like reference numerals and detailed discussion therefor will be omitted in order to avoid redundant discussion and whereby to keep the disclosure simple enough to facilitate clear understanding of the present invention. The third embodiment is differentiated from the embodiment of FIG. 1 in that the third embodiment of the path timing detection circuit 6-4 is provided a cumulator 25 which can output an overflow signal 26 as the cumulator.

This cumulator 25 is constructed with an N-bit adder 27 and a cumulation value buffer portion 28. Number of bits of the N-bit adder is preliminarily set at the bit number to cause overflow when the threshold value 21 is exceeded to use the overflow signal 26 of the N-bit adder 27 as replacement of the power comparators 17 in the foregoing embodiments. By this, circuit scale corresponding to the power comparator 17 can be reduced to achieve the object of the present invention.

Figure 11:
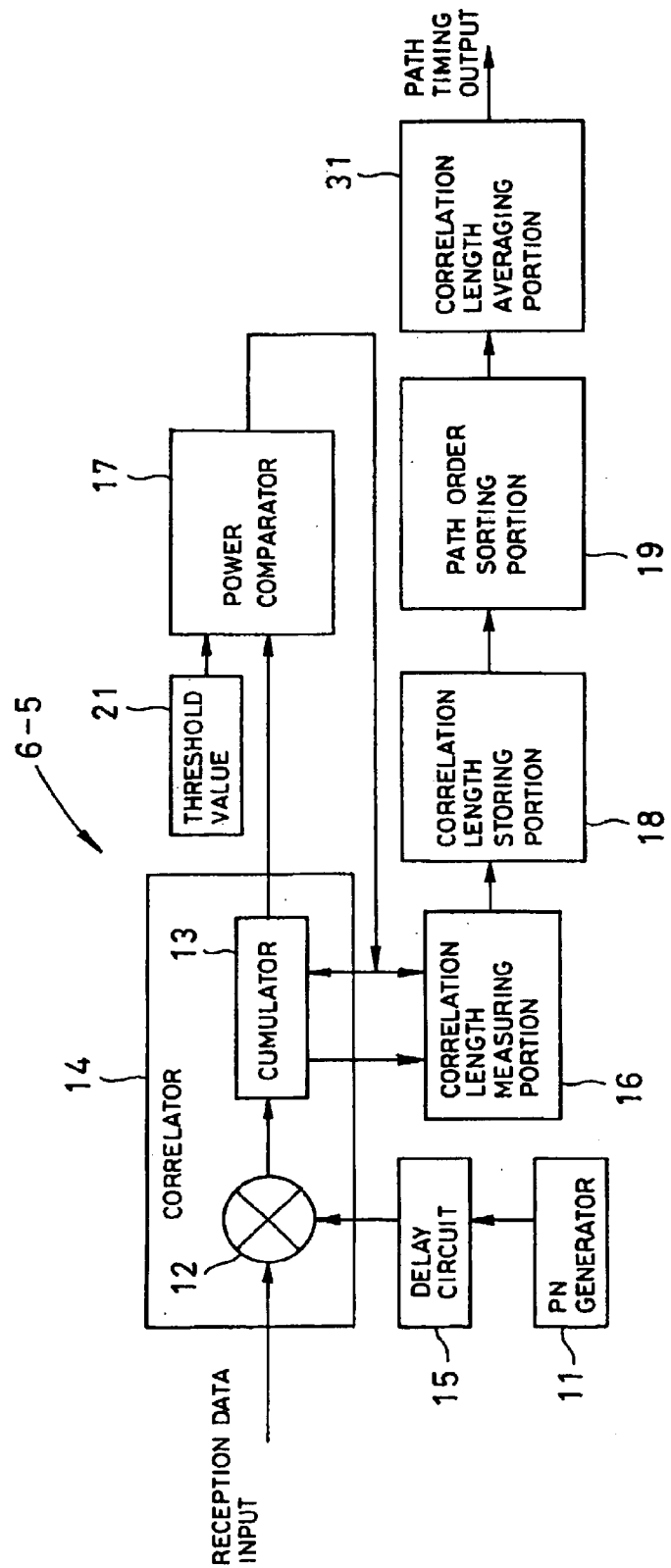
FIG. 11 is a constructional illustration of the fourth embodiment of the path timing detection circuit 6 according to the present invention.

Next, discussion will be given for the fourth embodiment. FIG. 11 is a constructional illustration of the fourth embodiment of the path timing detector circuit according to the present invention. In FIG. 11, like components to those in the former embodiment (FIG. 1) will be identified by like reference numerals and detailed discussion therefor will be omitted in order to avoid redundant discussion and whereby to keep the disclosure simple enough to facilitate clear understanding of the present invention. The fourth embodiment is differentiated from the former embodiment of FIG. 1 in that the fourth embodiment of the path timing detector circuit 6-5 is provided a correlation length averaging portion 31 is provided on the output side of the path order sorting portion 19.

By adding the correlation length averaging portion 31 in the former embodiments, it becomes possible to take an average of the correlation length (cumulation number) to reach the threshold value 21 at each sampling point by repeating path detection process for a plurality of times. Then, for the RAKE finger portions 4, output is made for each finger portion in order of smallest cumulation value (correlation length) L to reach the threshold value on average. As set forth above, this is because judgment can be made that the higher reception level corresponds to the path having the smaller cumulation number, namely reaching the threshold value level even in the condition at low spreading rate equivalently. In actual propagation environment, in the environment containing a large amount of noise component and interference component, error in path detection can be reduced with the construction set forth above.

On the other hand, in the mobile communication, it becomes possible to average fluctuations of the path level due to fading during motion and shadowing or the like. Conventionally, it has been known to average the obtained correlation power over a relatively long period to attain similar effect. However, in this case, bit width of data becomes large. In contrast to this, in case of averaging in the shown embodiment, it is only required to average the count value of number of times of addition, averaging can be performed with relatively small number of bits.

Figure 12:
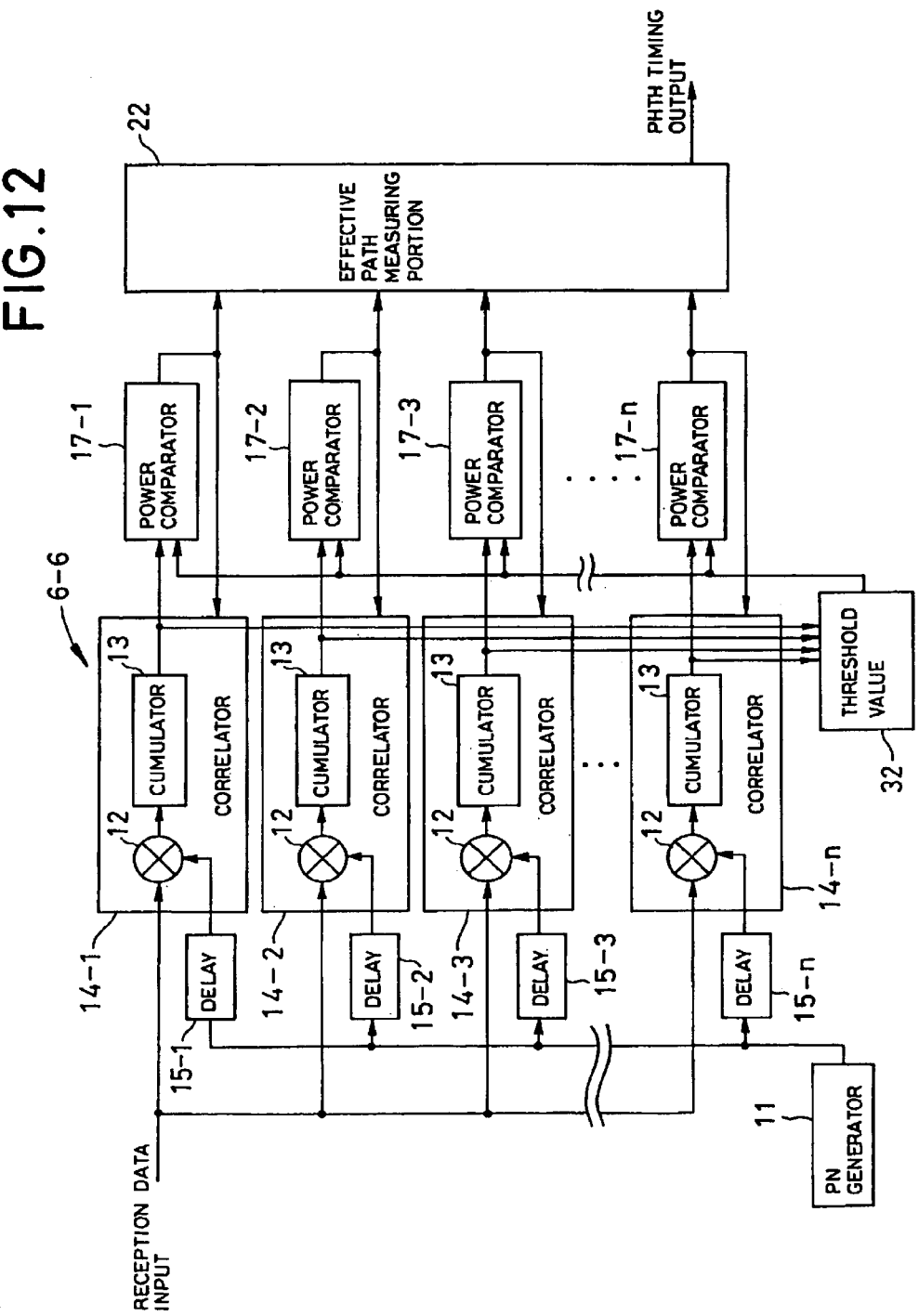
FIG. 12 is a constructional illustration of the fifth embodiment of the path timing detection circuit 6 according to the present invention.
Figure 13:
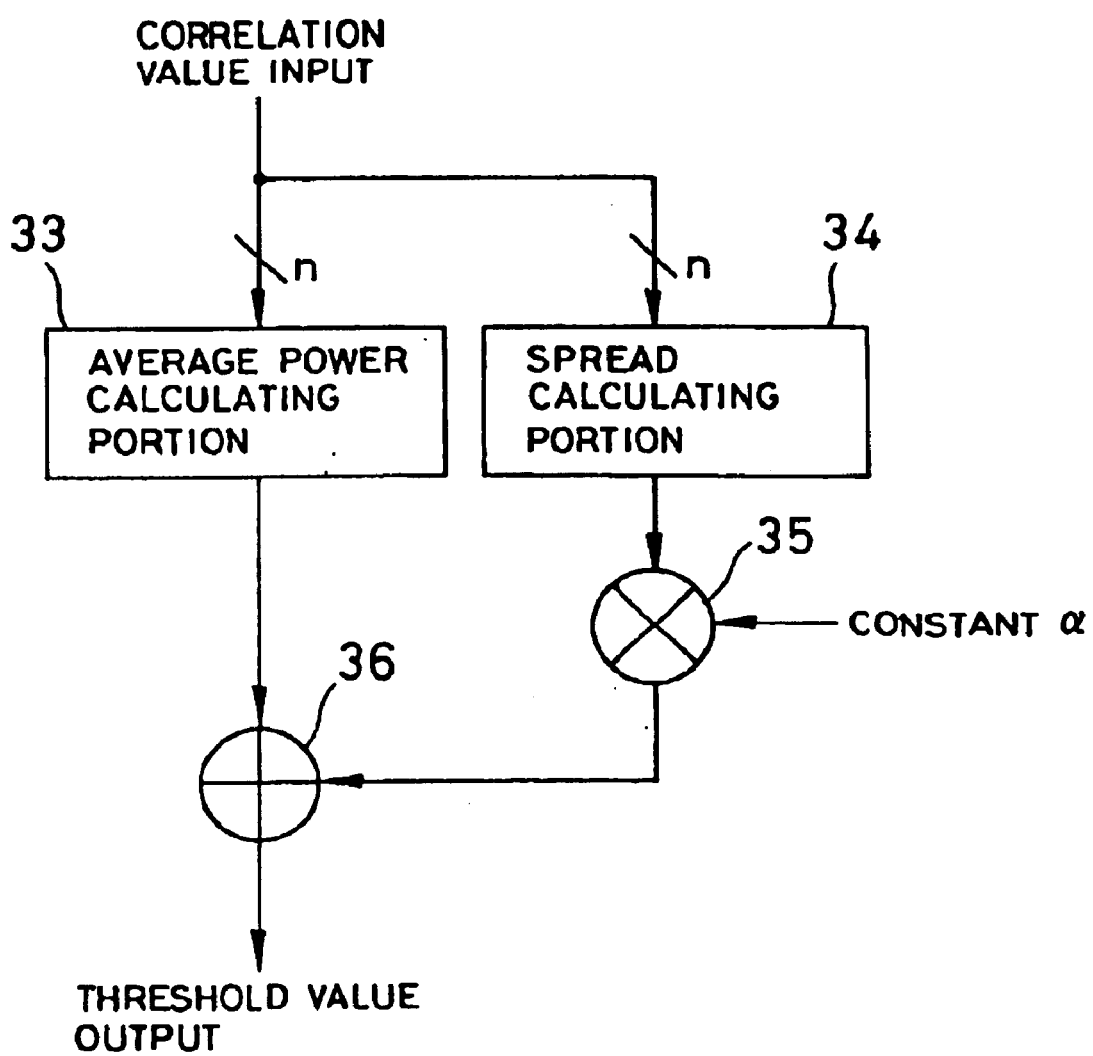
FIG. 13 is a constructional illustration of a threshold value estimating portion 32.

Next, discussion will be given for the fifth embodiment. FIG. 12 is a constructional illustration of the fifth embodiment of the path timing detector circuit according to the present invention. In FIG. 12, like components to those in the former embodiment (FIG. 1) will be identified by like reference numerals and detailed discussion therefor will be omitted in order to avoid redundant discussion and whereby to keep the disclosure simple enough to facilitate clear understanding of the present invention. The fifth embodiment is differentiated from the former embodiment of FIG. 7 in that the fifth embodiment of the path timing detector circuit 6-6 is provided with a threshold value estimating portion 32 in place of the threshold value 21. While the threshold value as fixed value is taken in the former embodiments, it is also possible to make the threshold value variable for enabling optimal setting. To the threshold value estimating portion 32, the cumulation value is input from each cumulator 13 to output the designated threshold value to each power comparator 17. FIG. 13 shows an example of construction of the threshold value estimating portion 32. Referring to FIG. 13, the threshold value estimating portion 32 is constructed with an average power calculating portion 33 which calculates a power average value of the result of correlation from respective correlators 4, a spreading calculating portion 34 calculating spreading of all sampling points, a multiplier 35 performing multiplication of an output of the spread calculating portion 34 and a constant a and an adder 36 for adding an output of the multiplier 35 and an output of the average power calculating portion 33.

By this, an average value in distribution of the result of correlation at respective sampling point and a width of the distribution are estimated to output threshold value=average power value+spread×α (α is preliminarily set constant). Accordingly, the operation can be taken place with taking a level to be judged sufficiently large with respect to fluctuation of the floor level of the delay profile, as the threshold value 21. The threshold value depending upon the environment of the interference level or the like can be set. For this purpose, when the propagation environment is good, a proper path judgment can be performed with lesser consumed current. By increasing arithmetic operation amount depending upon degradation of the propagation environment, it is possible to improve the detection accuracy.

Figure 14:
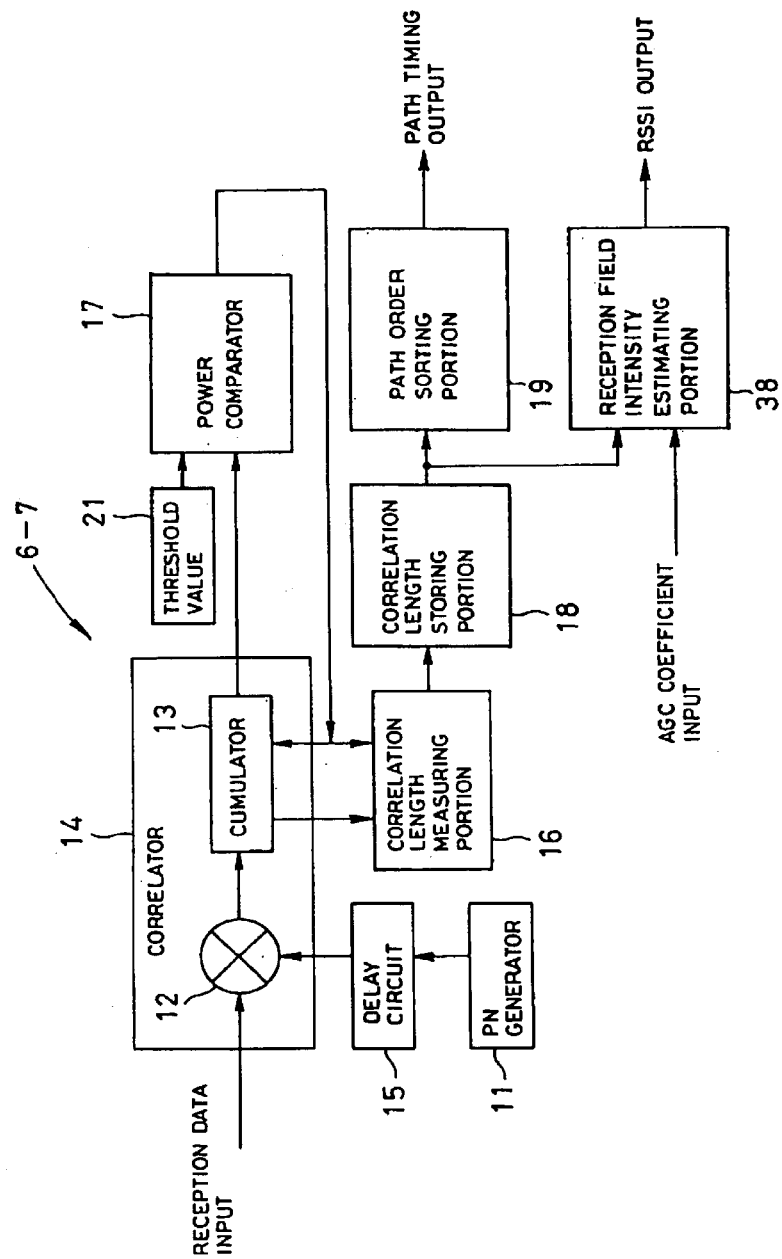
FIG. 14 is constructional illustration of the sixth embodiment of the path timing detection circuit 6 according to the present invention.
Figure 15:
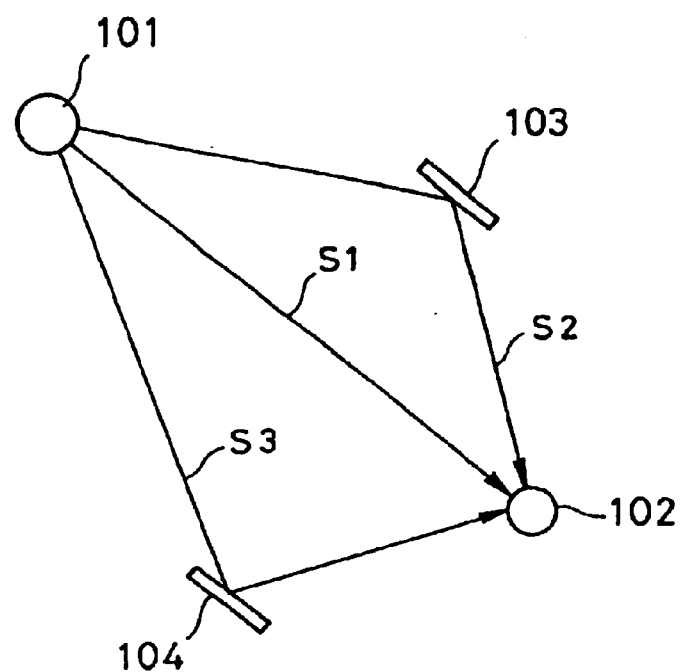
FIG. 15 is a diagrammatic constructional illustration for explaining a multiple path.

Next, discussion will be given for the sixth embodiment of the path timing detector circuit according to the present invention. FIG. 14 is a constructional illustration of the sixth embodiment. In FIG. 14, like components to those in the former embodiment (FIG. 1) will be identified by like reference numerals and the detailed discussion therefor will be omitted for avoiding redundant disclosure and whereby for keeping the disclosure simple enough to facilitate clear understanding of the present invention. The sixth embodiment is differentiated from the former embodiment of FIG. 1 in that the path order sorting portion 19 and a reception field intensity estimating portion 38 are connected in parallel to the output side of the correlation length storing portion 18 in the sixth embodiment of the path timing detector circuit 6-7.

In case of the former embodiment of FIG. 1, the correlation value (correlation power value) cannot be subject to relative comparison of the reception level since the correlation length L is not constant. Therefore, the reception field intensity estimating portion 38 can be calculated the correlation length×AGC (Automatic Gain Controller) coefficient is calculated and whereby can estimate the reception field intensity. Here, the AGC coefficient is a coefficient converted from a gain of an AGC amplifier of the high frequency reception circuit portion 2 in FIG. 2. By this, even in the system which requires measurement of the reception field intensity per path as set forth above, the path timing detector circuit according to the present invention can be applied.

According to the present invention, since the path timing detector circuit performing a correlative arithmetic operation of a spread modulation wave and a predetermined spread code with a given period of delay and detecting a reception timing of the spread modulation signal via each path on the basis of a result of the correlative arithmetic operation, comprises monitoring means for monitoring whether a cumulated value exceeds a threshold value during a process of the correlative arithmetic operation, and correlative arithmetic operation control means responsive to the cumulated value in excess of the threshold value for stopping the correlative arithmetic operation in a corresponding delay period, current consumption can be saved.

In particular, according to the present invention, since the correlative arithmetic operation is stopped upon exceeding the set threshold value, path can be detected at short correlation length, particularly in the good propagation environment. Therefore, necessary of extra correlative arithmetic operation can be avoided. Also, since bit number of the result of correlation can be smaller than normal result of arithmetic operation, number of bits of the adder in the cumulating portion and buffer storing the cumulated value can be reduced to contribute for reduction of circuit scale. Furthermore, by providing preference among effective paths on the basis of the correlation length upon exceeding of the threshold value, even when the number of effective paths is greater than number of RAKE fingers, the paths may be assigned to the fingers in order of higher preferential order.

On the other hand, according to another aspect of the present invention, since the path timing detection method performing a correlative arithmetic operation of a spread modulation wave and a predetermined spread code with a given period of delay and detecting a reception timing of the spread modulation signal via each path on the basis of a result of the correlative arithmetic operation, comprises a first step of monitoring whether a cumulated value exceeds a threshold value during a process of the correlative arithmetic operation, and a second step initiated in responsive to the cumulated value in excess of the threshold value, of stopping the correlative arithmetic operation in a corresponding delay period, similar effect to those set forth above can be attained.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A path timing detector circuit performing a correlative arithmetic operation of a spread modulation wave and a predetermined spread code with a given period of delay and detecting a reception timing of said spread modulation signal via each path on the basis of a result of the correlative arithmetic operation, comprising:

monitoring means for monitoring whether a cumulated value exceeds a threshold value during a process of the correlative arithmetic operation;

correlative arithmetic operation control means responsive to said cumulated value in excess of said threshold value for stopping the correlative arithmetic operation in a corresponding delay period;

storing means for storing a correlation length defined as a number of times of cumulation at the time of stopping of said correlative arithmetic operation; and path candidates classifying means for classifying detected candidates according to the stored correlation length.

2. A path timing detector circuit as set forth in claim 1, wherein said correlative arithmetic operation is performed for a plurality of times with said given period of delay.

3. A path timing detector circuit as set forth in claim 1, which comprises a plurality of correlative arithmetic operation means for performing plurality of correlative arithmetic operation simultaneously corresponding to a plurality of delay period.

4. A path timing detector circuit as set forth in claim 1, which further comprises second correlative arithmetic operation control means for stopping arithmetic operation in all of said correlative arithmetic operation when number of cumulated values exceeding said threshold value, exceeds a predetermined number.

5. A path timing detector circuit as set forth in claim 4, wherein said plurality of correlative arithmetic operation means are grouped to form a plurality of sets, each set having at least two correlative arithmetic operations means and said path timing detector circuit further includes an OR circuit for obtaining an OR operative of one set of correlative arithmetic operation means, said correlative arithmetic operation control means stopping correlative arithmetic operations by said one set of correlative arithmetic operation means on the basis of the output from said OR means and permitting correlative arithmetic operations to proceed for other sets of correlative arithmetic operation means.

6. A path timing detector circuit as set forth in claim 1, wherein said cumulation circuit includes an adder which overflows when said threshold value is exceeded, and said monitoring means makes judgment that the threshold value is exceeded upon occurrence of overflow.

7. A path timing detector circuit as set forth in claim 1, which further includes average value deriving means for deriving an average value of number of times of cumulation of path candidate output from said path candidate classifying means.

8. A path timing detector circuit as set forth in claim 3, which further comprises threshold value estimating means for estimating said threshold value from the output from a plurality of correlative arithmetic operation means.

9. A path timing detector circuit as set forth in claim 1, which further comprises a reception field intensity estimating means for estimating a field intensity of a reception wave on the basis of number of times of cumulation at a time where the cumulated value in the process of the correlative arithmetic operation exceeds the threshold value and an AGC coefficient of a high frequency reception circuit upon reception of the reception wave causing the cumulated value.

10. A path timing detection method performing a correlative arithmetic operation of a spread modulation wave and a predetermined spread code with a given period of delay and detecting a reception timing of said spread modulation signal via each path on the basis of a result of the correlative arithmetic operation, comprising the steps of:

monitoring whether a cumulated value exceeds a threshold value during a process of the correlative arithmetic operation;

in responsive to said cumulated value being excess of said threshold value, stopping the correlative arithmetic operation in a corresponding delay period;

storing a correlation length defined as a number of times of cumulation at a time of stopping of said correlative arithmetic operation; and classifying detected candidates according to the correlation length upon stopping of said correlative arithmetic operation.

11. A path timing detector method as set forth in claim 10, wherein said correlative arithmetic operation is performed for a plurality of times with said given period of delay.

12. A path timing detector circuit performing a correlative arithmetic operation of a spread modulation wave and a predetermined spread code with a given period of delay and detecting a reception timing of said spread modulation signal via each path on the basis of a result of the correlative arithmetic operation, comprising:

a monitoring circuit for monitoring whether a cumulated value exceeds a threshold value during a process of the correlative arithmetic operation;

a correlative arithmetic operation control circuit responsive to said cumulated value in excess of said threshold value for stopping the correlative arithmetic operation in a corresponding delay period;

a storing circuit for storing a correlation length defined as a number of times of cumulation at the time of stopping of said correlative arithmetic operation; and path candidates classifying circuit for classifying detected candidates according to the stored correlation length.

13. A path timing detector circuit as set forth in claim 12, wherein said correlative arithmetic operation is performed for a plurality of times with said given period of delay.

14. A path timing detector circuit as set forth in claim 12, which comprises a plurality of correlative arithmetic operation circuits for performing plurality of correlative arithmetic operation simultaneously corresponding to a plurality of delay period.

15. A path timing detector circuit as set forth in claim 12, which further comprises a second correlative arithmetic operation control circuit for stopping arithmetic operation in all of said correlative arithmetic operation when the number of cumulated values exceeding said threshold value, exceeds a predetermined number.

16. A path timing detector circuit as set forth in claim 17, wherein said plurality of correlative arithmetic operation circuits are grouped to form a plurality of sets, each set having at least two correlative arithmetic operation circuits, and said path timing detector circuit further includes OR circuits for obtaining an OR operation of one set of correlative arithmetic operation circuits, said correlative arithmetic operation control circuit stopping correlative arithmetic operations by said one set of correlative arithmetic operation circuit on the basis of the output from said OR circuit and permitting correlative arithmetic operations to proceed for other sets of correlative arithmetic operation circuits.

17. A path timing detector circuit as set forth in claim 12, wherein said cumulation circuit includes an adder which overflows when said threshold value is exceeded, and said monitoring circuit makes judgment that the threshold value is exceeded upon occurrence of said overflow.

18. A path timing detector circuit as set forth in claim 12, which further includes an average value deriving circuit for deriving an average value of the number of times of cumulation of path candidates output from said path candidate classifying circuit.

19. A path timing detector circuit as set forth in claim 14, which further comprises a threshold value estimating circuit for estimating said threshold value from the output from a plurality of correlative arithmetic operation circuits.

20. A path timing detector circuit as set forth in claim 12, which further comprises a reception field intensity estimating circuit for estimating a field intensity of a reception wave on the basis of number of times of cumulation at a time where the cumulated value in the process of the correlative arithmetic operation exceeds the threshold value and an AGC coefficient of a high frequency reception circuit upon reception of the reception wave causing the cumulated value.

* * * * *